(12) United States Patent
Roderick

(10) Patent No.: US 10,796,180 B2
(45) Date of Patent: Oct. 6, 2020

(54) PARALLEL IMAGE PROCESSING FOR MULTIPLE BIOMETRICS CAPTURE

(71) Applicant: Securiport LLC, Washington, DC (US)

(72) Inventor: Edward Roderick, Annapolis, MD (US)

(73) Assignee: Securiport LLC, Washington, DC (US)

( * ) Notice: Subject to any disclaimer, the term of this patent is extended or adjusted under 35 U.S.C. 154(b) by 228 days.

(21) Appl. No.: 15/894,510

(22) Filed: Feb. 12, 2018

(65) Prior Publication Data

US 2019/0251381 A1 Aug. 15, 2019

(51) Int. Cl.
*G06K 9/00* (2006.01)

(52) U.S. Cl.
CPC ..... *G06K 9/00986* (2013.01); *G06K 9/00892* (2013.01)

(58) Field of Classification Search
CPC .............. G06K 9/00986; G06K 9/00892
USPC .................. 382/115–118, 124–127
See application file for complete search history.

(56) References Cited

U.S. PATENT DOCUMENTS

| 8,736,695 | B2 | 5/2014 | Hwang et al. | |
| 2009/0245591 | A1* | 10/2009 | Rowe | G06K 9/00033 382/115 |
| 2012/0120256 | A1* | 5/2012 | Hwang | G06T 1/20 348/207.1 |
| 2014/0279640 | A1* | 9/2014 | Moreno | G06Q 50/265 705/325 |
| 2015/0048754 | A1* | 2/2015 | Davies | H05B 33/089 315/291 |
| 2017/0091433 | A1* | 3/2017 | Anderson | G06F 21/32 |

\* cited by examiner

*Primary Examiner* — Andrew M Moyer
(74) *Attorney, Agent, or Firm* — Brake Hughes Bellermann LLP

(57) ABSTRACT

According to an implementation, a biometric camera device includes a plurality of image sensors including a first image sensor and a second image sensor, and a plurality of biometric processors including a first biometric processor connected to the first image sensor and a second biometric processor connected to the second image sensor. The first biometric processor is configured to receive and process image data from the first image sensor according to a first biometric algorithm, and the second biometric processor is configured to receive and process image data from the second image sensor according to a second biometric algorithm. The biometric camera device includes a controller connected to each of the plurality of biometric processors. The controller is configured to receive processed biometric data from each of the biometric plurality of biometric processors.

20 Claims, 9 Drawing Sheets

700

```
┌─────────────────────────────────────────────────────────┐
│ Detecting, by a first image sensor of a plurality of    │
│ image sensors, first image data, the plurality of image │──702
│ sensors defining a total field of view, the first image │
│ sensor having a first field of view that corresponds to │
│ a first subsection of the total field of view           │
└─────────────────────────────────────────────────────────┘
                            │
                            ▼
┌─────────────────────────────────────────────────────────┐
│ Detecting, by a second image sensor of the plurality of │
│ image sensors, second image data, the second image      │──704
│ sensor having a second field of view that corresponds   │
│ to a second subsection of the total field of view       │
└─────────────────────────────────────────────────────────┘
                            │
                            ▼
┌─────────────────────────────────────────────────────────┐
│ Processing, by a first biometric processor connected to │
│ the first image sensor, the first image data according  │──706
│ to a first biometric algorithm to extract a first       │
│ biometric template                                      │
└─────────────────────────────────────────────────────────┘
                            │
                            ▼
┌─────────────────────────────────────────────────────────┐
│ Processing, by a second biometric processor connected   │
│ to the second image sensor, the second image data       │──708
│ according to a second biometric algorithm to extract a  │
│ second biometric template                               │
└─────────────────────────────────────────────────────────┘
                            │
                            ▼
┌─────────────────────────────────────────────────────────┐
│ Receiving, by a controller connected to each of the     │
│ first and second biometrics processors, the first       │──710
│ biometric template and the second biometric template    │
│ from the first biometric processor and the second       │
│ biometric processor, respectively                       │
└─────────────────────────────────────────────────────────┘
```

FIG. 7

PARALLEL IMAGE PROCESSING FOR MULTIPLE BIOMETRICS CAPTURE

BACKGROUND

Accurate biometrics template extraction from optical sensors may require relatively high resolution images to be captured. International Civil Aviation Organization (ICAO) and other international standards require relatively large fields of view to be able to accommodate travelers of all heights and physical disabilities. This is generally accomplished by either moving cameras, auto-focusing cameras, or multiple cameras each with its own image processing algorithm running on a computer. In some examples, one or more cameras may be positioned on a moving/self-adjusting platform, which are coupled to guides, and the user uses the guides to align the cameras in the proper position for image capture. All image processing is then performed on a powerful computer, either locally or network attached. Local computers may require additional infrastructure to handle the increase in power and heat loads, and the network attached computers may have to deal with limitations of network latency affecting real time processing. These conventional approaches may result in increased capture and processing time. However, minimizing processing time is important to border security and airport applications.

Furthermore, to create a multi-biometric image sensor with a large field of view (in some cases, an omnidirectional field of view), the required resolution of the image sensor may exceed devices that are commercially available and may exceed physical limits of available image sensors, communication methods and processors.

SUMMARY

The details of one or more implementations are set forth in the accompanying drawings and the description below. Other features will be apparent from the description and drawings, and from the claims.

According to an implementation, a biometric camera device includes a plurality of image sensors including a first image sensor and a second image sensor, and a plurality of biometric processors including a first biometric processor connected to the first image sensor and a second biometric processor connected to the second image sensor. The first biometric processor is configured to receive and process image data from the first image sensor according to a first biometric algorithm, and the second biometric processor is configured to receive and process image data from the second image sensor according to a second biometric algorithm. The biometric camera device includes a controller connected to each of the plurality of biometric processors. The controller is configured to receive processed biometric data from each of the biometric plurality of biometric processors.

According to some implementations, the biometric camera device may include one or more of the following features (or any combinations thereof). In some examples, the first biometric algorithm and the second biometric algorithm relate to a same biometric. In some examples, the first biometric algorithm and the second biometric algorithm relate to different biometrics. The first biometric algorithm may relate to face recognition and the second biometric algorithm may relate to palm detection. The controller may be communicatively coupled to a host computing device. The controller may be configured to transmit, over a network, the processed biometric data to the host computing device. The controller may be configured to receive reprogramming information, over a network, from the host computing device, where the reprogramming information includes instructions for the controller to reprogram the first biometrics processor to process the image data according to a biometric algorithm different than the first biometric algorithm. The plurality of image sensors defines a total field of view, and the total field of view may be divided into distinct, separate subsections including a first subsection and a second subsection. The first image sensor may have a field of view corresponding to the first subsection, and the second image sensor may have a field of view corresponding to the second subsection. The first image sensor may have a first field of view, and the second image sensor may have a second field of view, where the second field of view at least partially overlaps with the second field of view. The first biometric processor may include a field-programmable gate array. The first biometric processor may include an application specific integrated circuit (ASIC) processor. The controller may include a microcontroller (MCU). The controller may be connected to the first biometric processor via at least one data communication line and at least one reprogramming line. The first biometric algorithm may include extracting a biometric template and a reference image from the image data detected by the first image sensor.

According to an implementation, a method for parallel image processing for capturing one or more biometrics includes detecting, by a first image sensor of a plurality of image sensors, first image data. The plurality of image sensors defines a total field of view, and the first image sensor has a first field of view that corresponds to a first subsection of the total field of view. The method includes detecting, by a second image sensor of the plurality of image sensors, second image data. The second image sensor has a second field of view that corresponds to a second subsection of the total field of view. The method includes processing, by a first biometric processor connected to the first image sensor, the first image data according to a first biometric algorithm to extract a first biometric template, processing, by a second biometric processor connected to the second image sensor, the second image data according to a second biometric algorithm to extract a second biometric template, and receiving, by a controller connected to each of the first and second biometrics processors, the first biometric template and the second biometric template from the first biometric processor and the second biometric processor, respectively.

According to some implementations, the method may include one or more of the following features (or any combination thereof). The method may further include receiving, by the controller from a host computing device communicatively coupled to the controller, reprogramming instructions to reprogram the first biometric processor, and reprogramming the first biometric processor to process the first image data according to a biometric algorithm different than the first biometric algorithm. The method may further include detecting, by a third image sensor of the plurality of image sensors, third image data, the third image sensor having a third field of view that corresponds to a third subsection of the total field of view, and processing, by a third biometric processor connected to the third image sensor, the third image data according to a third biometric algorithm to extract a third biometric template.

According to an implementation, a non-transitory computer readable medium storing executable instructions that when executed by at least one processor is configured to perform parallel image processing for capturing one or more biometrics. The executable instructions include detect, by a first image sensor of a plurality of image sensors, first image data, where the plurality of image sensors defines a total field of view, and the first image sensor has a first field of view, detect, by a second image sensor of the plurality of image sensors, second image data, where the second image sensor has a second field of view, and the second field of view at least partially overlaps with the first field of view, process, by a first biometric processor connected to the first image sensor, the first image data according to a first biometric algorithm to extract a first biometric template, process, by a second biometric processor connected to the second image sensor, the second image data according to a second biometric algorithm to extract a second biometric template, where the second image data is processed at least partially in parallel with the first image data, and the second biometric algorithm is different to the first biometric algorithm, and receive, by a controller connected to each of the first and second biometrics processors, the first biometric template and the second biometric template from the first biometric processor and the second biometric processor, respectively.

According to some implementations, the executable instructions may include one or more of the following operations (or any combination thereof). The executable instructions may include detect, by a third image sensor of the plurality of image sensors, third image data, where the third image sensor has a third field of view, and the third field of view is a subsection of a total field of view different than the first field of view, and process, by a third biometric processor connected to the third image sensor, the third image data according to a third biometric algorithm to extract a third biometric template. The executable instructions may include receive, by the controller from a host computing device communicatively coupled to the controller, reprogramming instructions to reprogram the first biometric processor, and reprogram the first biometric processor to process the first image data according to a different biometric algorithm.

According to an implementation, a biometric camera device includes searching, by a first pair of image sensors, a first subsection of an overall field of view of a biometrics camera, where the first pair of image sensors includes a first image sensor and a second image sensor, searching, by a second pair of image sensor, a second subsection of the overall field of view of the biometrics camera, where the second pair of image sensors includes a third image sensor and a fourth image sensor, processing, by a first biometric processor connected to the first image sensor, image data captured by the first image sensor from the first subsection according to a first biometric algorithm, processing, by a second biometric processor connected to the second image sensor, image data captured by the second image sensor from the first subsection according to a second biometric algorithm, processing, by a third biometric processor connected to the third image sensor, image data captured by the third image sensor from the second subsection according to the first biometric algorithm, and processing, by a fourth biometric processor connected to the fourth image sensor, image data captured by the fourth image sensor from the second subsection according to the second biometric algorithm.

BRIEF DESCRIPTION OF THE DRAWINGS

FIG. 7 is a flowchart illustrating example operations of a biometric camera device according to an implementation.

DETAILED DESCRIPTION

Figure 1:
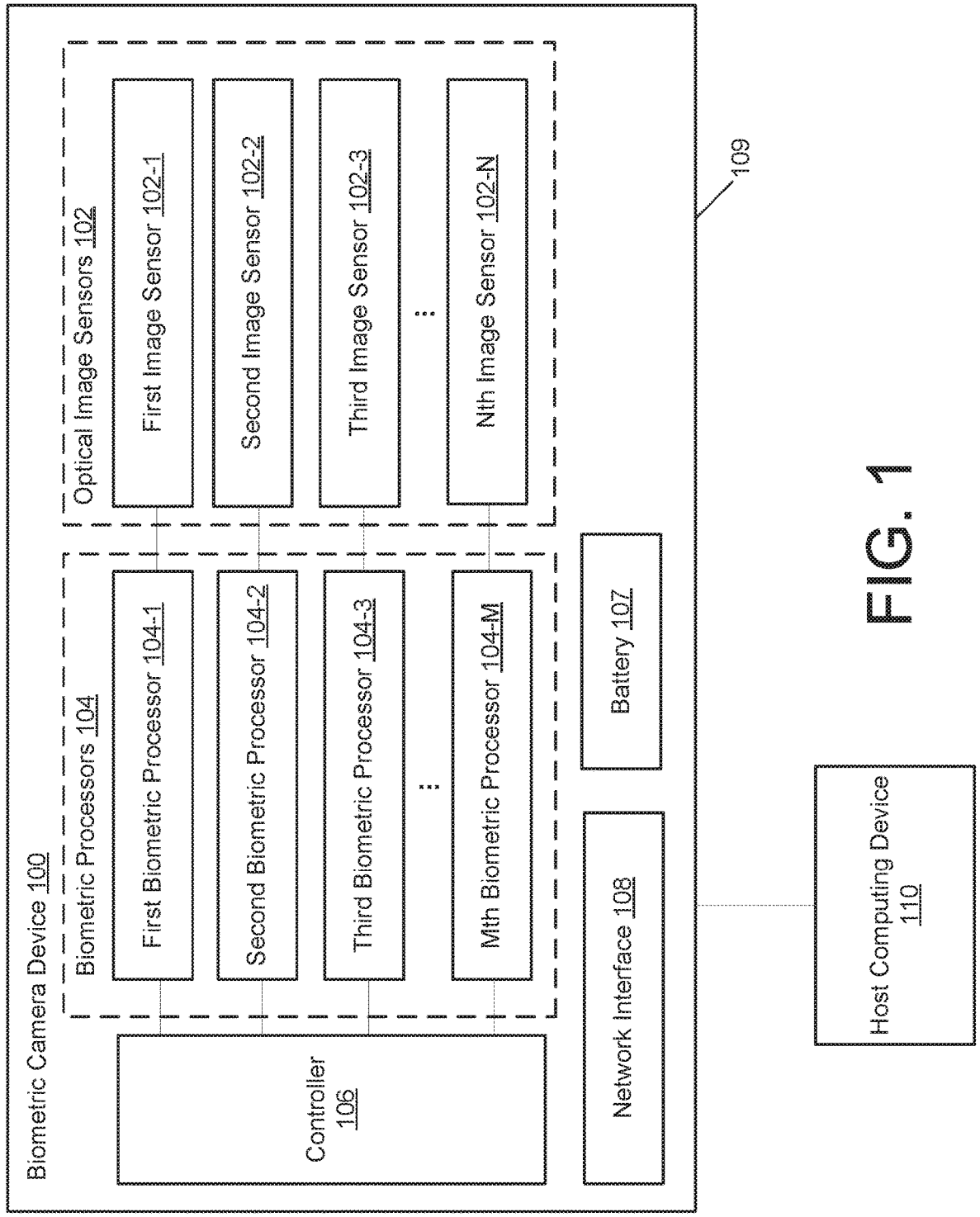
FIG. 1 illustrates a biometric camera device for parallel image processing for capturing one or more biometrics according to an implementation.

According to an aspect, the implementations discussed herein provide a single biometric camera device having multiple image sensors with dedicated biometric processors (e.g., dedicated field programmable gate array (FPGA) or application specific integrated circuit (ASIC) processors) that perform image capture, evaluation, and biometric processing in parallel. For example, the biometric camera device may perform all image evaluation, processing, and biometric template extraction locally (e.g., independent of any connected computer, either by direct, indirect, or network connection). The flexibility of the biometric processors and the system architecture discussed herein allows for a relatively large number of image sensors to be arranged in any geometric pattern to maximize overall field of view and optimize extraction of one to multiple biometric templates. In some examples, multiple image sensors with dedicated hardware circuitry (e.g., FPGA or ASIC Chips), which are optimized for biometrics capture, are embodied into a single physical device. In some examples, the image sensors and the biometric processors that perform the image-based biometric processing are included within the same housing or attached to a common frame. The multiple embedded image sensors can be arranged to process subsections of the total field of view, and/or to search overlapping areas for different biometrics at the same time. In some examples, the biometric camera device may perform dynamic allocation of image processors to portions of image data from the full field of view, for example assigning multiple biometric processors to perform template generation from images on the subset of sensors that are detecting a high-quality iris image. Also, this device may focus on extracting the biometric template and a reference image from the overall field of view, where only the relevant information (e.g., biometric template and reference image) is sent to a host computing device. For example, instead of sending the entire video feed and having the host computing device determine which frame includes a face (e.g., in the case of facial recognition), the biometric camera device makes that determination, and only sends the relevant data back to the host computing device, which can reduce the amount of information transferred over a network and increase the processing time. Furthermore, as all image processing occurs locally and with dedicated hardware, a large field of view and biometrics capture can happen simultaneously and in real time.

Furthermore, the biometric camera device may maximize the resolution and field of view with no moving parts or human direction. The grid of sensors may allow the lenses to be focused on smaller subsections of the desired field of view, thereby increasing the pixel density for each subsection. This may allow the system to operate with a short focal depth and maintain a large depth of field where accurate ICAO complainant biometric images can be acquired.

FIG. 1 illustrates a biometric camera device 100 for parallel image processing for capturing one or more biometrics according to an implementation. The biometric camera device 100 includes a plurality of image sensors 102, a plurality of biometric processors 104, a controller 106, and a network interface 108. In some examples, the biometric camera device 100 includes a battery 107. In some examples, the biometrics camera device 100 may be connected to an external power source (e.g., a power socket). In some examples, the biometrics camera device 100 may be relatively compact and relatively mobile in which a person can easily move the biometrics camera device 100 from one location to another location (e.g., move the biometrics camera device 100 from an electronic date to an immigration booth). Also, the biometric camera device 100 includes a housing 109 that is configured to at least partially enclose the components of the biometric camera device 100 (e.g., the image sensors 102, the biometric processors 104, the controller 106, the battery 107, and the network interface 108). The housing 109 may include a single casing or a casing having multiple components that are coupled together. The housing 109 may include one or more polymer-based materials and/or metal-based materials.

The biometric camera device 100 may be used in a wide variety of applications, which may include border security, airport security, and/or generally any type of application that uses image processing and biometrics. In some examples, the biometric camera device 100 can be disposed at an electronic gate, an immigration booth, an event admission kiosk, or a border control system.

The biometric camera device 100 may capture image data from the image sensors 102 and process the image data (at least partially in parallel) using the biometric processors 104 such that one or multiple biometrics can be captured simultaneously (at or around the same time) in real-time or near real time. A biometric may be the measurement and/or calculation of a human characteristic such as facial recognition, facial expression recognition, signature, keystrokes, DNA, palm detection, palm print, hand geometry, iris detection, shape of the ear, fingerprints, behavioral characteristics, or generally any metric relating to a human characteristic that can serve to identify and/or label a person or group of people. The biometric camera device 100 may provide a relatively large field of view in which multiple biometrics can be searched in different or same field of view subsections. The image processing is performed locally (e.g., within the biometric camera device 100), which can speed up the processing time as compared with conventional methods that perform the biometric processing at a computer apart from the sensors.

In some examples, the image sensors 102 include digital sensors. In some examples, the image sensors 102 include analog sensors. In some examples, the image sensors 102 include charge coupled device (CCD) sensors. In some examples, the image sensors 102 include Complementary Metal Oxide Semiconductor (CMOS) sensors. In some examples, each image sensor 102 includes a lens defining a field of view (in which information is detected as an image). In some examples, the image sensors 102 include large field of view (e.g., 90 degrees or larger) image sensors. In some examples, the image sensors 102 include non-autofocus, high resolution (e.g., 1920×1080 pixels or higher) sensors with a relatively fast data rate to stream uncompressed images in real time. In some examples, the data rate is greater or equal to 30 frames per second.

The image sensors 102 may be arranged in a geometric shape or pattern. In some examples, the image sensors 102 are arranged in a two-dimensional shape. In some examples, the image sensors 102 are arranged in a three-dimensional shape. In some examples, the geometric shape includes one or more curved portions and one or more linear portions. In some examples, the geometric shape includes a sphere portion. The type of geometric shape or pattern may depend on the application of the biometric camera device 100. In some examples, the image sensors 102 are un-patterned or do not form a particular pattern.

The image sensors 102 may include a first image sensor 102-1, a second image sensor 102-2, and a third image sensor 102-3 through Nth image sensor 102-N. In some examples, N may be any integer greater or equal to four. In some examples, N may be greater or equal to 5. In some examples, N may be greater or equal to 10. In some examples, N may be greater or equal to 25. In some examples, N may be greater or equal to 100. Each of the image sensors 102 detects image data within its field of view. In some examples, the image sensors 102 are arranged such that each image sensor 102 has a non-overlapping field of view with each other. For example, the plurality of image sensors 102, collectively, may define a total field of view (e.g., the part of its surroundings that is visible through the biometric camera device 100 at a particular position and orientation). The total field of view is divided into a plurality of subsections, where the field of view of each individual image sensor 102 corresponds to a different, non-overlapping section of the total field of view. In particular, the first image sensor 102-1 may have a first field of view that corresponds to a first subsection of the total field of view, the second image sensor 102-2 may have a second field of view that corresponds to a second subsection of the total field of view, and the third image sensor 102-3 may have a third field of view that corresponds to a third subsection of the total field of view, and so forth. In some examples, the first subsection, the second subsection, and the third section (and continuing to the Nth section) are different, non-overlapping areas within the total field of view of the biometric camera device 100.

In some examples, the image sensors 102 are arranged such that two or more of the image sensors 102 have overlapping (e.g., partially overlapping, or fully overlapping) field of views. For example, the first field of view of the first image sensor 102-1 may overlap (e.g., partially or fully) with the second field of view of the second image sensor 102-2. In some examples, the third field of view of the third image sensor 102-3 may overlap (e.g., partially or fully) with the second field of view of the second image sensor 102-2 and/or the first field of view of the first image sensor 102-1. In other examples, the third field of view of the third image sensor 102-3 may overlap (e.g., partially or fully) with the second field of view of the second image sensor 102-2 but does not overlap (e.g., completely separate) with the field of view of the first image sensor 102-1.

The biometric camera device 100 may include a dedicated biometric processor 104 connected to each of the plurality of image sensors 102. For example, instead of sending the imaging data to a high-powered computer for data processing, the biometric processors 104 may perform image processing and biometric extraction at the device level, thereby increasing the processing speed at which biometrics can be extracted. The number (M) of biometric processors 104 may equal the number (N) of image sensors 102. A first biometric processor 104-1 may be connected to the first image sensor 102-1, a second biometric processor 104-2 may be connected to the second image sensor 102-2, a third biometric processor 104-3 may be connected to the third image sensor 102-3, and an Mth biometric processor 104-M may be connected to the Nth image sensor 102-N. In some examples, the biometric processors 104 include field-programmable gate arrays (FPGAs). In some examples, the biometric processors 104 include application specific integrated circuit (ASIC) processors. In some examples, the biometric processors 104 include a combination of FPGAs and ASIC.

The biometric processors 104 may process in parallel (e.g., partially or fully) image data received from the connected image sensors 102 according to one or more biometric algorithms. The image data may be an individual still image or a sequence of images (or frames) constituting a video. In some examples, the image data is digital image data. In some examples, the image data may be a numeric representation of a two-dimensional image having digital values called picture elements or pixels, where each pixel has a luminance value indicating a level of brightness. The image data may include a fixed number of rows and columns of pixels, where the pixels are the smallest individual element in an image, holding quantized values that represent the brightness of a given color at any specific point.

Each biometric processor 104 can be programmed either for the same biometric or different biometrics pending on which area of the field of view a biometric is expected to be present. For example, it may be determined that the second image sensor 102-2 and the third image sensor 102-3 are good candidates within the total field of view for iris detection (e.g., it is likely that a person's eyes would enter the field of views for the second image sensor 102-2 and the third image sensor 102-3), while the first image sensor 102-1 has a field of view that is good for facial recognition (e.g., it is likely that a person's face would enter the field of view for the first image sensor 102-1). In this case, the second biometric processor 104-2 and third biometric processor 104-3 would be programmed for iris detection, and the first biometric processor 104-1 would be programmed for facial recognition. For iris detection or facial recognition (or other biometrics), in some examples, a biometric algorithm includes checking the quality of the source image, determining the number of available minutia available for creating a biometric template, extracting a biometric template from the image data, and saving reference image data from the image data. The biometric template may be a digital reference of one or more distinct characteristics that have been extracted from the corresponding image data. For example, a fingerprint template may consist of a vector representation of minutia extracted from the reference image, consisting of x-y coordinates along with a minutiae type and strength. These templates may be compared by biometric matching systems to determine likelihood of match. These templates are smaller than the images from the image sensors 102 and are inherently comparable with each other, which speeds up processing. The reference image may be a WSQ compressed grayscale fingerprint image.

The first biometric processor 104-1 is configured to receive and process image data from the first image sensor 102-1 according to a first biometric algorithm. The second biometric processor 104-2 is configured to receive and process image data from the second image sensor 102-2 according to a second biometric algorithm. The third biometric processor 104-3 is configured to receive and process image data from the third image sensor 102-3 according to a third biometric algorithm. The Mth biometric processor 104-M is configured to receive and process image data from the Nth image sensor 102-N according to another biometric algorithm. In some examples, the first biometric algorithm, the second biometric algorithm, and the third biometric algorithm relate to the detection of the same biometric (e.g., all biometric processors 104 are used for the capture of the same biometric, e.g., face detection). In some examples, the first biometric algorithm is a different biometric algorithm relating to the capture of a different biometric than the other biometric algorithms. In these examples, the biometric processors 104 are configured to detect multiple different biometrics in parallel at different subsections of the total field of view (e.g., in the case where each image sensors 102 has a different, non-overlapping field of view) or at one of more of the same subsections (e.g., in the case where at least some of the image sensors 102 has overlapping field of views).

The controller 106 may be connected to each of the biometric processors 104. For example, the controller 106 may be connected to each of the first biometric processor 104-1, the second biometric processor 104-2, and the third biometric processor 104-3 through Mth biometric processor 104-M. In some examples, the controller 106 is connected to a particular biometric processor 104 via one or more data communication lines (which the controller 106 receives biometric data from the corresponding biometric processor 104) and one or more reprogramming lines (which the controller 106 can reprogram the corresponding biometric processor 104). In some examples, the controller 106 includes a microcontroller (MCU). In some examples, the controller 106 includes one or more computer processing units (CPUs) and a memory. The controller 106 may receive biometrics data from each of the biometric processors 104 via the one or more data communication lines, and buffer the biometrics data (e.g., while its being transferred to the host computing device 110). In some examples, the biometrics data includes an extracted template and reference image data.

The memory of the controller 106 may store the programming (e.g., hex) files for the biometric processing functions performed at the biometric processors 104. In some examples, each file corresponds to a different biometric algorithm. In some examples, each file corresponds to a different biometric processor 104.

The controller 106 may be communicatively coupled to a host computing device 110 via the network interface 108. In some examples, the network interface 108 is a wired interface, where the controller 106 is connected to the host computing device 110 via a wired connection. In some examples, the network interface 108 is a wireless network interface (e.g., mobile, Wi-Fi, short-range data communication, etc.), where the controller 106 wirelessly communicates with the host computing device 110. In some examples, the host computing device 110 may be remote from the biometric camera device 100 (e.g., at a different location within the same building or a different geographical location). In some examples, the host computing device 110 is a personal computer, laptop, or desktop computer. In some examples, the host computing device 110 includes one or more server devices.

The controller 106 may transmit, over a network (e.g., wireless or wired network connection) the biometric data to the host computing device 110. In some examples, the controller 106 only sends processing results data (e.g. whether a face was detected in the field of view) to the host computing device 110. In some examples, the controller 106 only sends the relevant biometric information (e.g., the extracted template and reference image data) to the host computing device 110 (e.g., as opposed to the image data captured from the image sensors 102 which can be relatively large and consume a large amount of bandwidth). In some examples, the biometric camera device 100 filters out the extraneous image data and sends only the captured biometric template and the reference image (thereby reducing data transfer load). In some examples the biometric camera device 100 may send only the "fact-of" detection of a valid biometric (e.g. a face) and its position in a scene.

The controller 106 may be configured to reprogram each biometric processor 104 to perform a different image processing algorithm upon commands from the host computing device 110 and new instruction files can be writable to the memory of the controller 106. For example, the biometric processors 104 can be reprogrammed to find other biometrics through the controller 106, which allows dynamic reconfiguring in the field. In some examples, the controller 106 receives reprogramming information, over a network (e.g., wireless or wired connection) from the host computing device 110. The reprogramming information may include instructions for the controller 106 to reprogram one or more of the biometrics processors 104. The controller 106 may reprogram one of more of the biometrics processors 104 based on the received reprogramming information. In some examples, the controller 106 may reprogram the first biometrics processor 104-1 to process its image data according to a biometrics algorithm different than the first biometrics algorithm. In some examples, the controller 106 may reprogram the first biometrics processor 104-1 for iris detection (instead of facial recognition). In some examples, the controller 106 may update (e.g., change, add, or delete) one or more settings for the current biometrics algorithm or may update to a newer version of the same algorithm. In some examples, the controller 106 may enable or disable one or more of the-biometric processors 104 if they are not needed or are not operating correctly.

Figure 2:
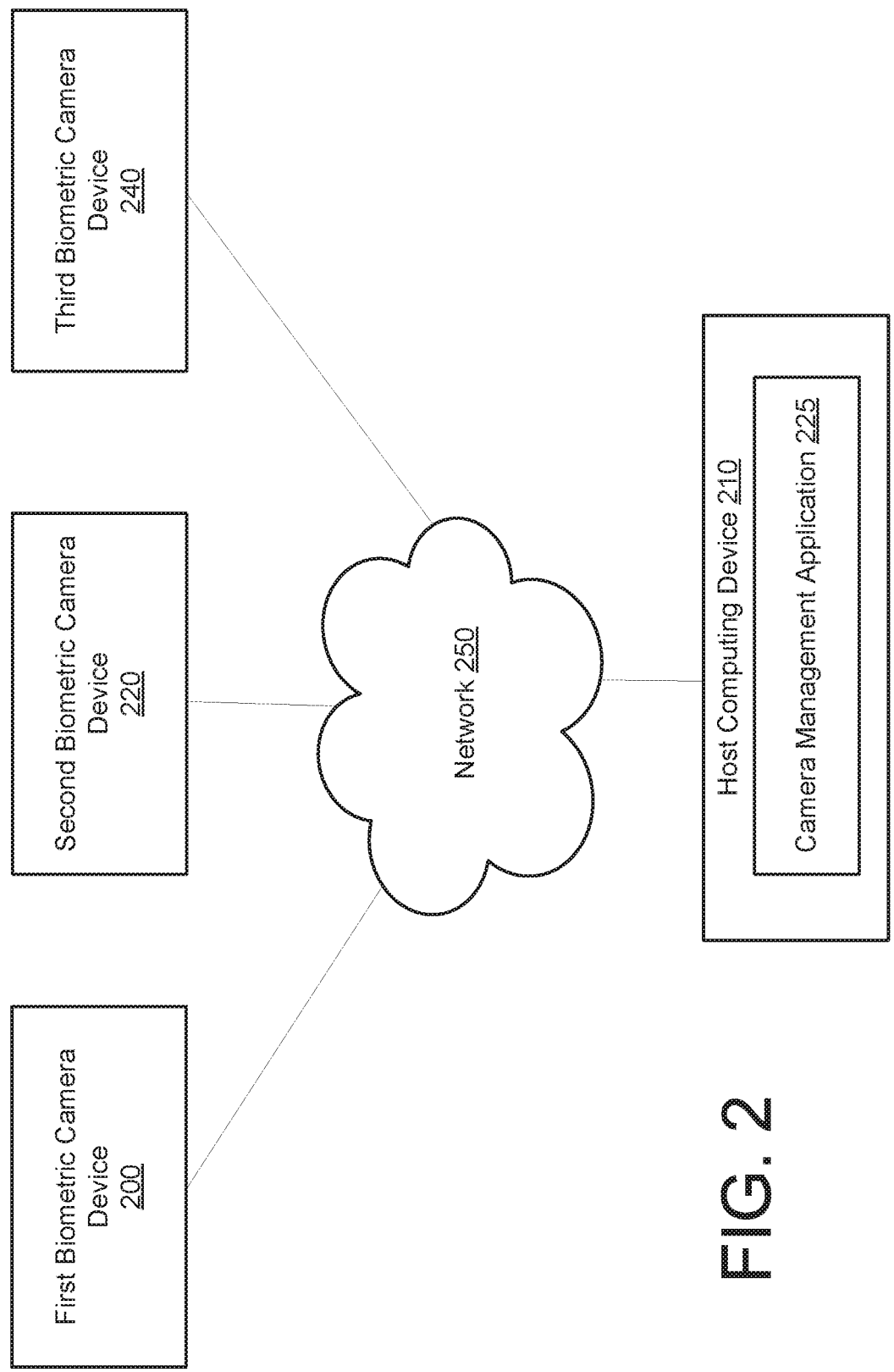
FIG. 2 illustrates a system having a host computing device for remotely reprogramming a plurality of biometric camera devices according to an implementation.

FIG. 2 illustrates a system 205 having a host computing device 210 for remotely controlling a plurality of biometric camera devices according to an implementation. As shown in in FIG. 2, the host computing device 210 is communicatively coupled, via a network 250, to a plurality of biometric camera devices including a first biometric camera device 200, a second biometric camera device 220, and a third biometric camera device 240. Each of the first biometric camera device 200, the second biometric camera device 220, and the third biometric camera device 240 may be any of the biometric camera devices discussed herein. In some examples, the hosting computing device 210 is a computer (laptop, desktop, tablet, etc.). In some examples, the hosting computing device 210 is a server. The hosting computing device 210 includes a camera management application 225 configured to remotely manage the settings of the biometric camera devices. In some examples, the camera management application 225 is a native application executing on an operating system of the hosting computing device 210. In some examples, the camera management application 225 is a web application executing on a remote server but accessed via the hosting computing device 210.

The network 250 may thus represent, for example, the public Internet or other wide area public or private network. The network 250 may represent, in further examples, a corporate or other intranet, and/or a smaller-scale, local or personal network, any of which may be implemented using standard network technology. In some examples, the network 250 is a wireless network secured by a security protocol.

Each of the first biometric camera device 200, the second biometric camera device 220, and the third biometric camera device 240 is configured to communicate with the host computing device 210. Each of these devices may include a client device that is configured to connect to the host computing device 210 via the network 250 such that the biometric camera devices and the host computing device 210 can communicate with each other. In some examples, the host computing device 210 may receive only the biometric data from each of the biometric camera devices (in the manner as explained above). In some examples, a user may use the camera management application 225 to reprogram one or more of the biometric camera devices. In this manner, a user can centrally control the settings of the biometric camera devices. In some examples, the first biometric camera device 200 may be located at location A, the second biometric camera device 220 may be located at location B, and the third biometric camera device 240 may be located at location C. Locations A, B, and C may be different locations within a building (e.g., different locations within the airport) or different geographical locations (e.g., different locations along a country's border). However, by using the camera management application 225, a user can centrally control the different biometric camera devices.

The host computing device 210 may send reprogramming information to the first biometric camera device 200. The reprogramming information sent to the first biometric camera device 200 may include instructions on reprogramming one or more biometric processors included within the first biometric camera device 200. In some examples, one or more of the biometric processors included within the first biometric camera device 200 may be reprogrammed to process image data from their corresponding image sensors according to a different biometric. The host computing device 210 may send reprogramming information to the second biometric camera device 220, and the third biometric camera device 240 in the same fashion. Also, it is noted that although the system 205 depicts three biometric camera devices, the system 205 may include any number of biometric camera devices.

Figure 3:
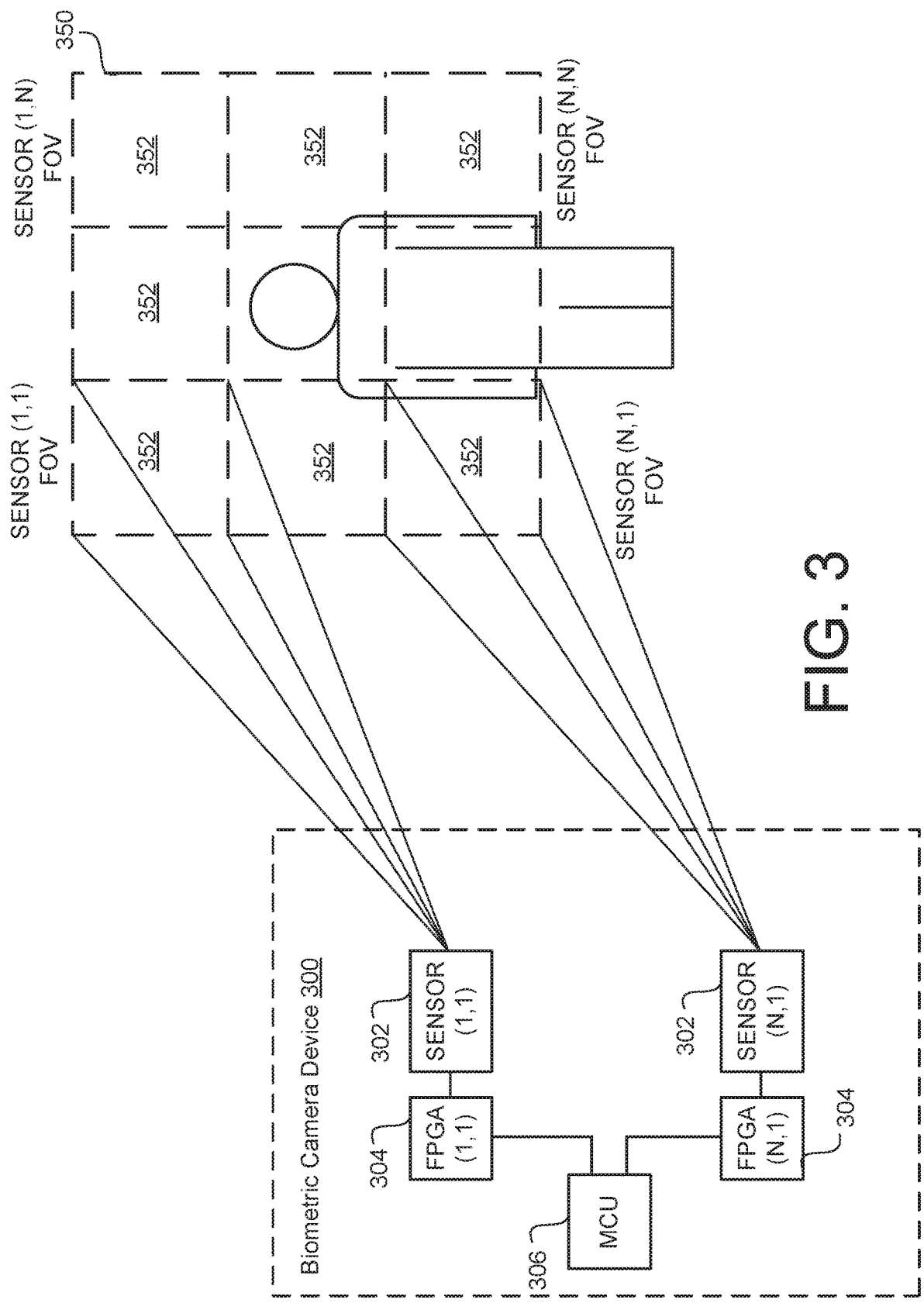
FIG. 3 illustrates a biometric camera device for parallel image processing for capturing one or more biometrics according to another implementation.

FIG. 3 illustrates a biometric camera device 300 for parallel image processing for capturing one or more biometrics according to another implementation. The biometric camera device 300 includes 1 to N image sensors 302 with 1 to N dedicated FPGAs 304 for each image sensor 302. Each FPGA 304 is configured to function as an image processor for the image data captured by its corresponding image sensor 302. Each FPGA 304 can separately implement an image processing algorithm as physical hardware circuitry, which may be more efficient in performing parallel computations and can be faster (e.g., orders of magnitude faster) than software running on an operating system. Each FPGA 304 is connected to a controlling microcontroller (MCU) 306 through one or more data communication lines and one or more reprogramming lines. The image sensors 302 may be arranged in any geometric shape or pattern, which may be dependent on the type of application of the biometric camera device 300.

As shown in FIG. 3, the image sensors 302, collectively, define a total field of view 350. The image sensors 302 may be arranged such that the total field of view 350 is divided into smaller subsections 352, where each subsection corresponds to a field of view of a different image sensor 302. In other words, the individual image sensors 302 have field of views that do not substantially overlap with each other. As shown in FIG. 3, the image sensors 302 include sensor (1, 1) and sensor (N, 1). The sensor (1, 1) has a field of view (FOV) that corresponds to a particular subsection 352 (e.g., first row, first column) of the total field of view 350. The sensor (N, 1) has a field of view (FOV) that corresponds to another subsection 352 (e.g., N row, first column) of the total field of view 350. In the example of FIG. 3, there are 9 image sensors 302. However, it is noted that the embodiments encompass any number of image sensors 302. Each image sensor 302 transmits its image data to the corresponding FPGA 304 to search for its target biometric. Each FPGA 304 is configured to extract a biometric template and save reference image data, and all information is fed to the MCU 306 for buffering.

Each FPGA 304 is programmed either for the same biometric or different biometrics pending on which area of the total field of view 350 a particular biometric can be expected to be present. In some examples, both sensor (1, 1) and sensor (1, N) may be configured for biometric A, or sensor (1, 1) may be configured for biometric A while sensor (N, 1) may be configured for biometric B, where biometric A, and biometric B are different biometrics.

Figure 4:
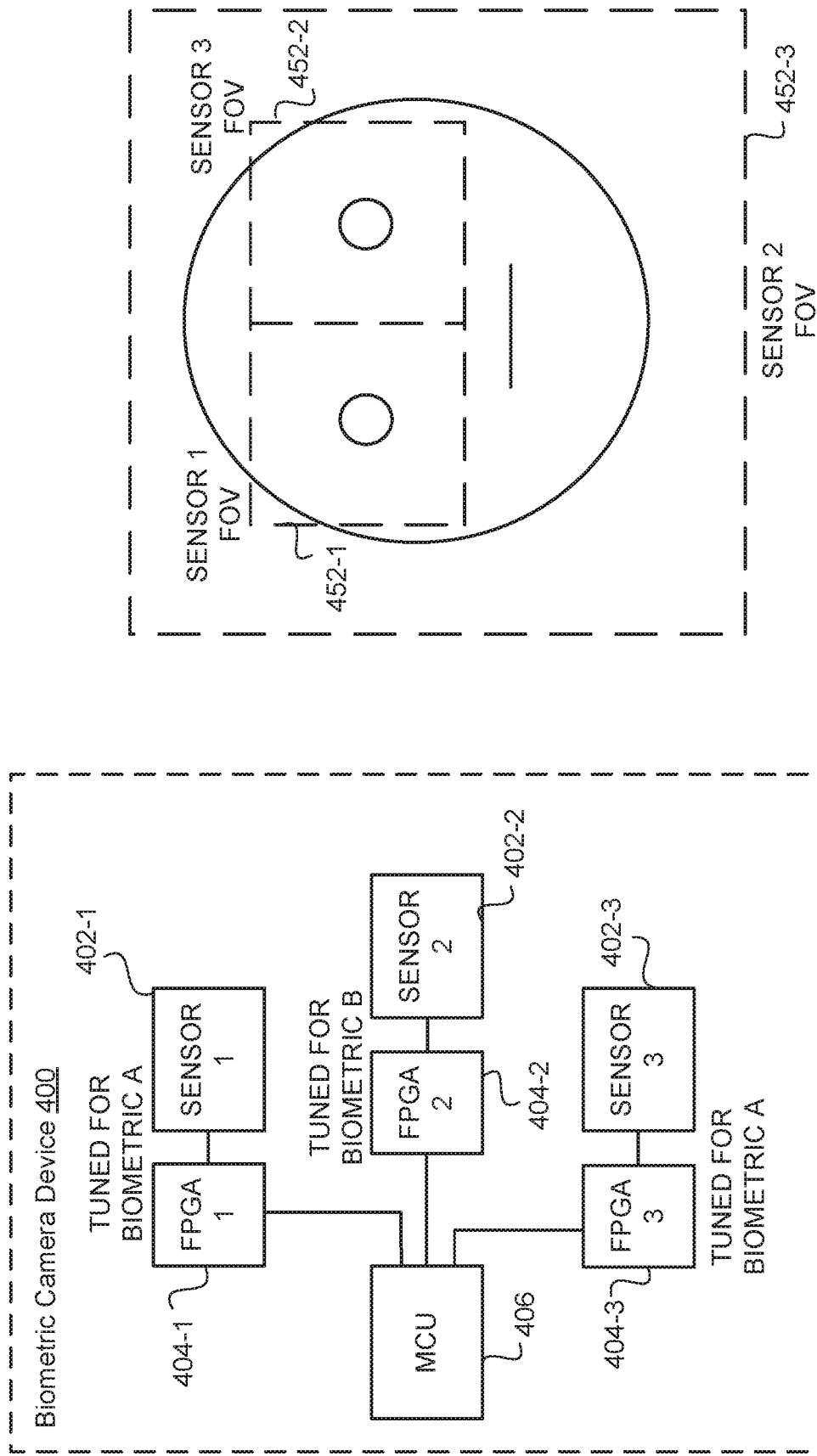
FIG. 4 illustrates a biometric camera device for parallel image processing for capturing one or more biometrics according to another implementation.

FIG. 4 illustrates a biometric camera device 400 for parallel image processing for capturing one or more biometrics according to another implementation. The biometric camera device 400 includes a first image sensor 402-1, a second image sensor 402-2, and a third image sensor 402-3. The biometric camera device 400 includes a first FPGA 404-1 connected to the first image sensor 402-1, a second FPGA 404-2 connected to the second image sensor 402-2, and a third FPGA 404-3 connected to the third image sensor 402-3. The biometric camera device 400 includes a microcontroller 406 connected to each of the first FPGA 404-1, the second FPGA 404-2, and the third FPGA 404-3. The biometric camera device 400 may include any of the features described with reference to any of the previous biometric camera devices (e.g., 100/200/300).

However, the biometric camera device 400 may have overlapping fields of view placed in proximity to each other, and these groups have a different biometric algorithm programmed into each FPGA 404 to optimize searching the field of view of multiple biometrics simultaneously. In other words, the biometric camera device 400 may place image sensors 402 in proximity to each other with overlapping fields of view and the FPGAs 404 programmed for different biometrics can capture multiple types of biometric templates simultaneously with no delay (or very little delay). In the example of FIG. 4, the first FPGA 404-1 is programmed for biometric A (e.g., iris detection—left eye), the second FPGA 404-2 is programmed for biometric B (e.g., facial recognition), and the third FPGA 404-3 is programmed for biometric A (e.g., iris detection—right eye). The first image sensor 402-1 may have a first field of view that corresponds to a first subsection 452-1, the second image sensor 402-2 may have a second field of view that corresponds to a second subsection 452-2, and the third image sensor 402-3 may have a third field of view that corresponds to a third subsection 452-3. As shown in FIG. 4, the second subsection 452-2 overlaps with the first subsection 452-1 and the third subsection 452-3, but the first subsection 452-1 is substantially separate from the third subsection 452-3. As such, the first image sensor 402-1 and the second image sensor 402-2 (and/or the third image sensor 402-3 and the second image sensor 402-2) can search the same area for different biometrics.

Figure 5:
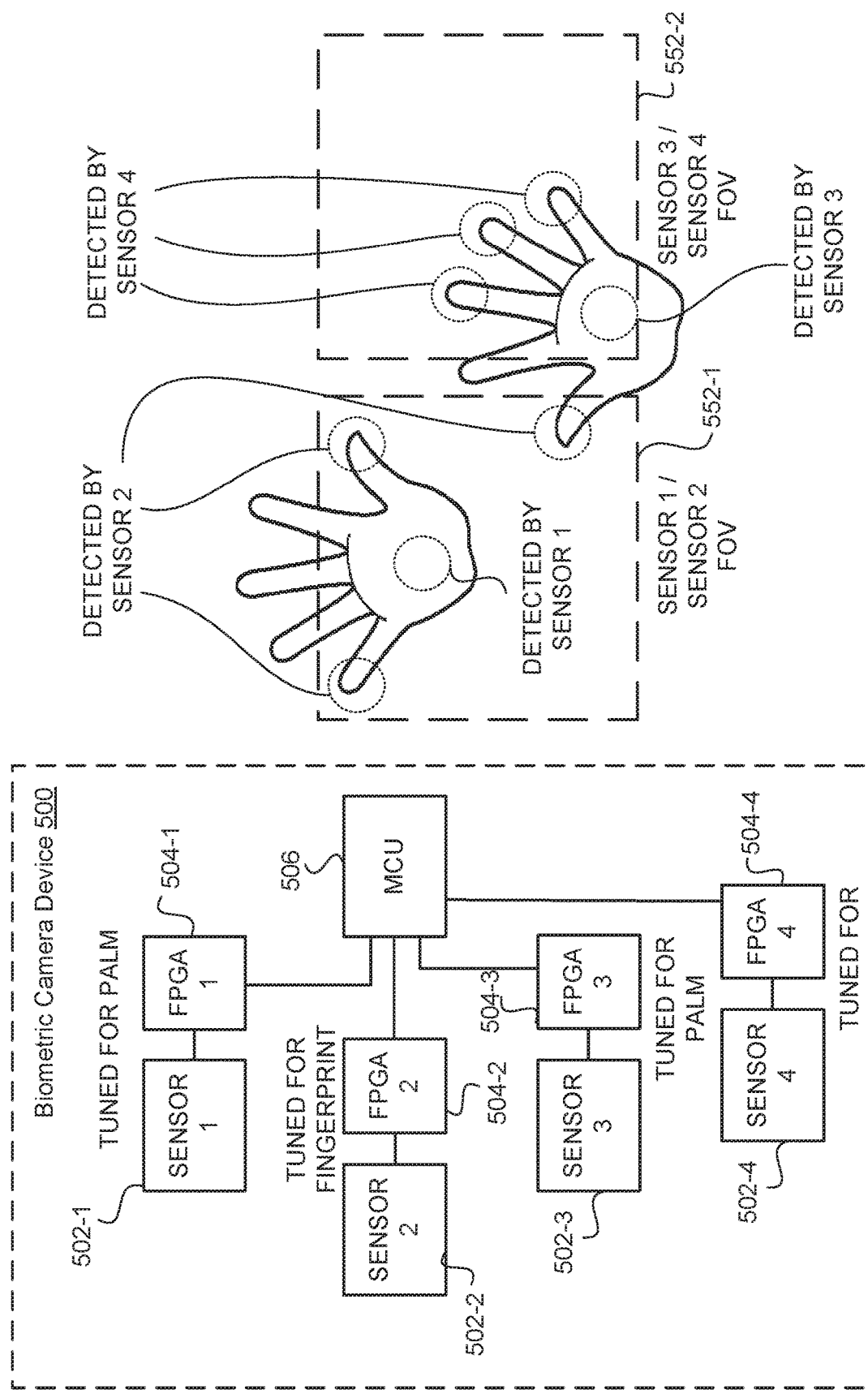
FIG. 5 illustrates a biometric camera device for parallel image processing for capturing one or more biometrics according to another implementation.

FIG. 5 illustrates a biometric camera device 500 for parallel image processing for capturing one or more biometrics according to another implementation. The biometric camera device 500 includes a grid of geometric pairs of image sensors. The geometric pairs may search the same subset of the overall field of view for their unique programmed biometrics. The pairs spread across the grid would allow for searching a relatively large field of view for all biometrics present in a person.

The biometric camera device 500 includes a first image sensor 502-1, a second image sensor 502-2, a third image sensor 502-3, and a fourth image sensor 504-4. The first image sensor 502-1 and the second image sensor 502-2 may be considered a first pair of image sensors, and the third image sensor 502-3 and the fourth image sensor 504-4 may be considered a second pair of image sensors. The first pair may search a first subsection of the overall field of view, and the second pair may search a second subsection of the overall field of view. In some examples, the second subsection may be distinct and separate from the first subsection.

The biometric camera device 500 includes a first FPGA 504-1 connected to the first image sensor 502-1, a second FPGA 504-2 connected to the second image sensor 502-2, a third FPGA 504-3 connected to the third image sensor 502-3, and a fourth FPGA 504-4 connected to the fourth image sensor 502-4. The biometric camera device 400 includes a microcontroller 506 connected to each of the first FPGA 504-1, the second FPGA 504-2, the third FPGA 504-3, and the fourth FPGA 504-4. The biometric camera device 500 may include any of the features described with reference to any of the previous biometric camera devices (e.g., 100/200/300/400).

Each image sensor within a respective pair may search for a unique programmed biometric. For example, with respect to the first pair, the first FPGA 504-1 is programmed for biometric A (e.g., palm detection), and the second FPGA 504-2 is programmed for biometric B (e.g., fingerprint). With respect to the second pair, the third FPGA 504-3 is programmed for biometric A (e.g., palm detection), and the fourth FPGA 504-4 is programmed for biometric B (e.g., fingerprint). Although two pairs of image sensors are shown in FIG. 5, it is understood that the biometric camera device 500 may include more than two pairs of image sensors (e.g., 3, 4, 5, or any number more than 5). In addition, although the second pair is programmed for the same biometrics as the first pair, in some examples, the second pair (or the third pair) is programed for a different set of biometrics than the first pair.

Figure 6:
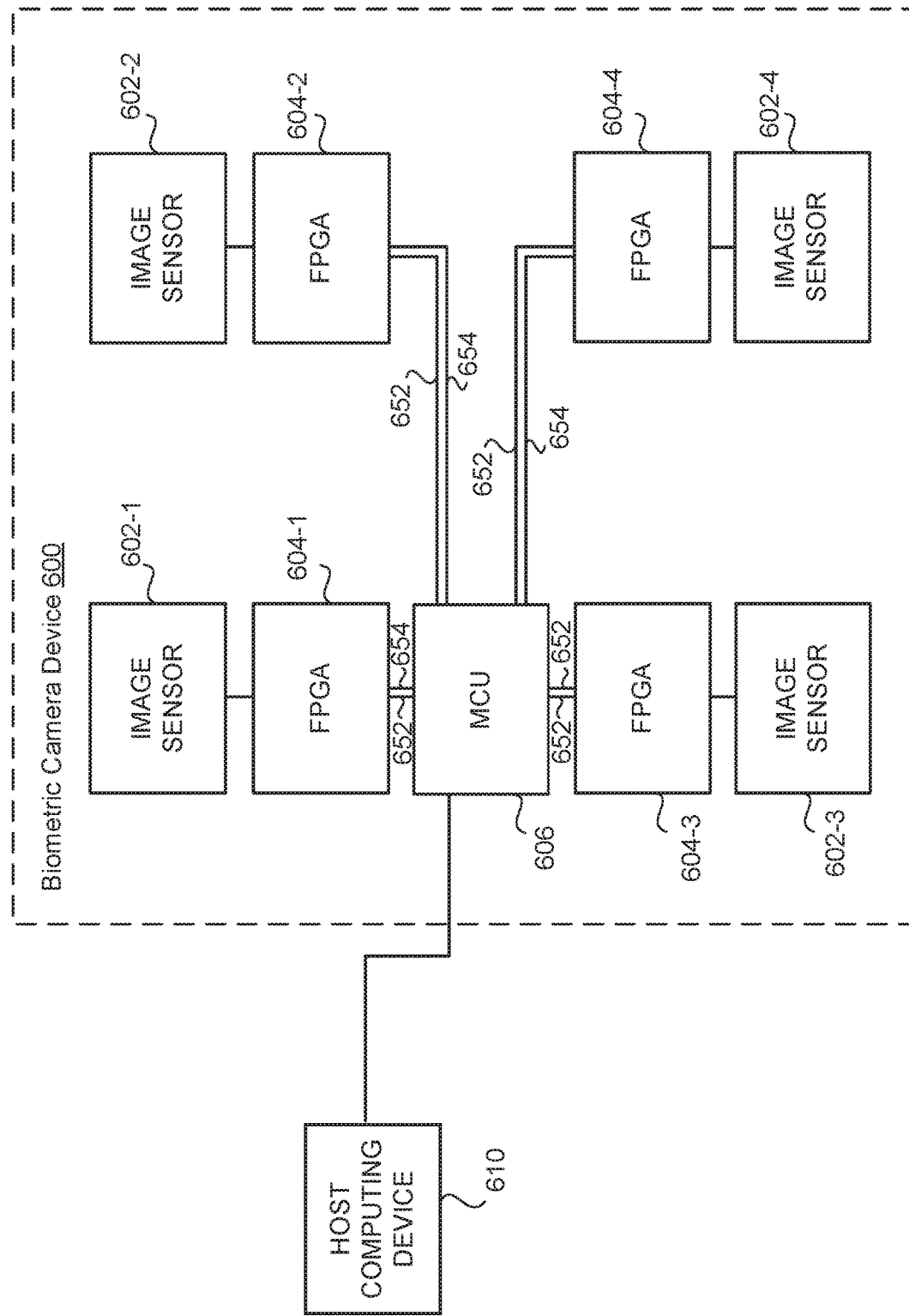
FIG. 6 illustrates a biometric camera device for parallel image processing for capturing one or more biometrics according to another implementation.

FIG. 6 illustrates a biometric camera device 600 for parallel image processing for capturing one or more biometrics according to another implementation. As shown in FIG. 6, the biometric camera device 600 is configured to communicate with a host computing device 610 via a wired or wireless connection. The biometric camera device 600 may include any of the features previously discussed with reference to FIGS. 1-5.

The biometric camera device 600 may include 1 to N image sensors with 1 to N dedicated FPGAs for each image sensor and a controlling MCU 606. For example, the biometric camera device 600 may include a first image sensor 602-1 connected to a first FPGA 604-1, a second image sensor 602-2 connected to a second FPGA 604-2, a third image sensor 602-3 connected to a third FPGA 604-3, and a fourth image sensor 602-4 connected to a fourth FPGA 602-4. In some examples, each image sensor 602 is connected to a corresponding FPGA 604 via one or more data communication lines 652 and one or more reprogramming lines 654. The biometric camera device 600 includes a MCU 606 that is connected to each of the first FPGA 604-1, the second FPGA 604-2, the third FPGA 604-3, and the fourth FPGA 604-4.

In some examples, the MCU 606 may have a standardized high speed communication port to the host computing device 610 (e.g., serial, parallel, wireless, or TCP/IP). Also, the MCU 606 includes an embedded memory. The embedded memory may store all programming (hex) files for the FPGA image processing functions (e.g., one file for Face Recognition, one for Iris, etc.). The MCU 606 may be configured to reprogram each FPGA to perform a different image processing algorithm upon commands from the host computing device 610 and new instruction files will be writeable to the embedded memory of the MCU 606. In some examples, the biometric camera device 600 includes 1 to N lenses with focal points directed to their respective image sensors. In some examples, the biometric camera device 600 is packaged as an external device that can be mounted on a desk, on electronic immigration gates, kiosks, automobiles, or handheld devices. In some examples, the biometric camera device 600 may be equipped with a battery and wireless communications for mobile applications.

FIG. 7 is a flowchart 700 illustrating example operations of a biometric camera device according to an implementation. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. The following operation may be performed by biometric camera device 100, 200, 300, and/or 600, and may include any additional features/operations discussed with reference to FIGS. 1-3 and 6.

Operation 702 includes detecting, by a first image sensor of a plurality of image sensors, first image data. The plurality of image sensors defines a total field of view. The first image sensor has a first field of view that corresponds to a first subsection of the total field of view.

Operation 704 includes detecting, by a second image sensor of the plurality of image sensors, second image data. The second image sensor has a second field of view that corresponds to a second subsection of the total field of view.

Operation 706 includes processing, by a first biometric processor connected to the first image sensor, the first image data according to a first biometric algorithm to extract a first biometric template.

Operation 708 includes processing, by a second biometric processor connected to the second image sensor, the second image data according to a second biometric algorithm to extract a second biometric template.

Operation 710 includes receiving, by a controller connected to each of the first and second biometrics processors, the first biometric template and the second biometric template from the first biometric processor and the second biometric processor, respectively.

Figure 8:
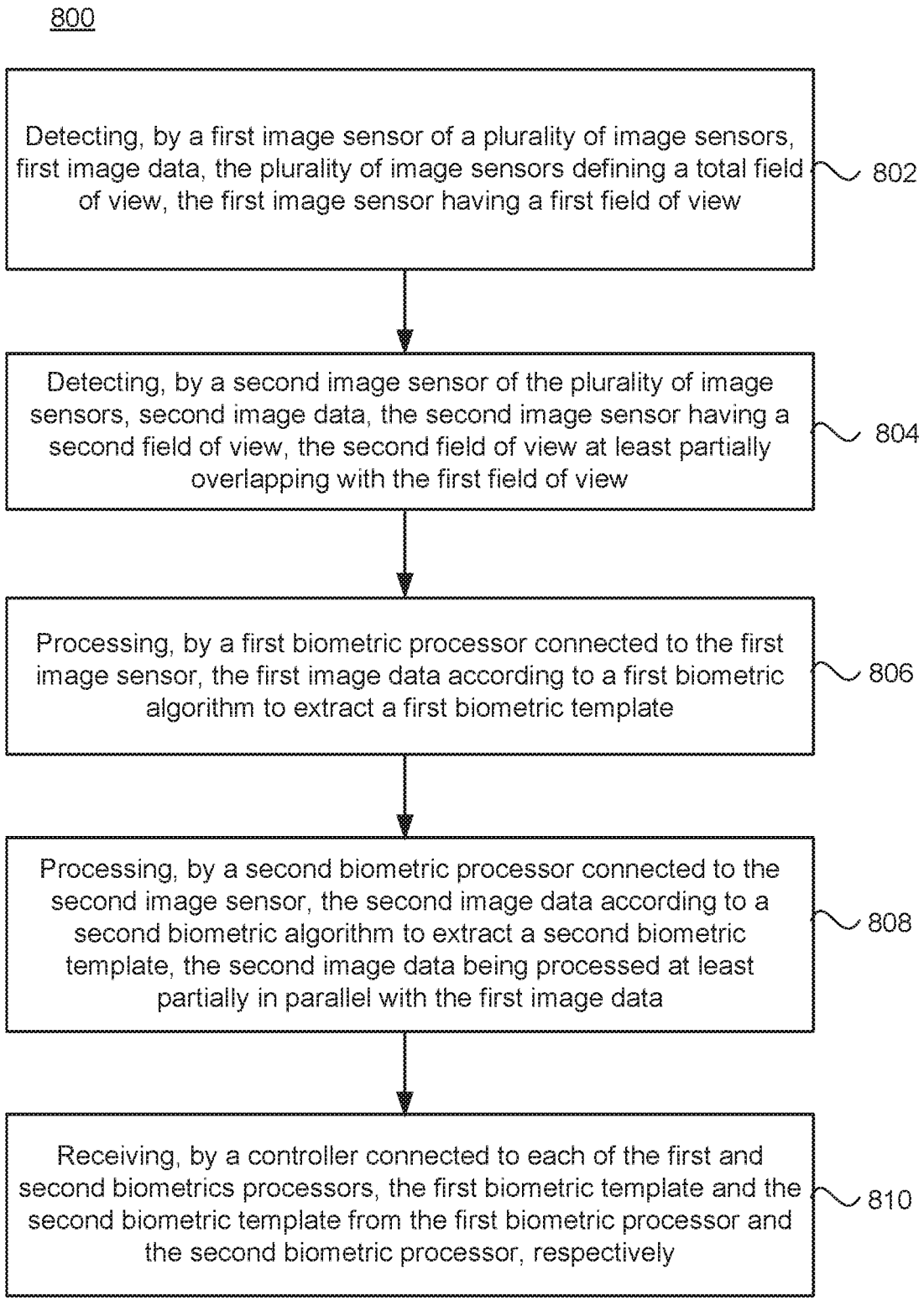
FIG. 8 is a flowchart illustrating example operations of a biometric camera device according to another implementation.

FIG. 8 is a flowchart 800 illustrating example operations of a biometric camera device according to another implementation. Although the flowchart 800 of FIG. 8 illustrates the operations in sequential order, it will be appreciated that this is merely an example, and that additional or alternative operations may be included. Further, operations of FIG. 8 and related operations may be executed in a different order than that shown, or in a parallel or overlapping fashion. The following operation may be performed by biometric camera device 100, 200, 400, and/or 600, and may include any additional features/operations discussed with reference to FIGS. 1, 2, 4, and 6.

Operation 802 includes detecting, by a first image sensor of a plurality of image sensors, first image data. The plurality of image sensors defines a total field of view. The first image sensor has a first field of view.

Operation 804 includes detecting, by a second image sensor of the plurality of image sensors, second image data. The second image sensor has a second field of view. The second field of view at least partially overlaps with the first field of view.

Operation 806 includes processing, by a first biometric processor connected to the first image sensor, the first image data according to a first biometric algorithm to extract a first biometric template.

Operation 808 includes processing, by a second biometric processor connected to the second image sensor, the second image data according to a second biometric algorithm to extract a second biometric template. The second image data is processed at least partially in parallel with the first image data.

Operation 810 includes receiving, by a controller connected to each of the first and second biometrics processors, the first biometric template and the second biometric template from the first biometric processor and the second biometric processor, respectively.

Figure 9:
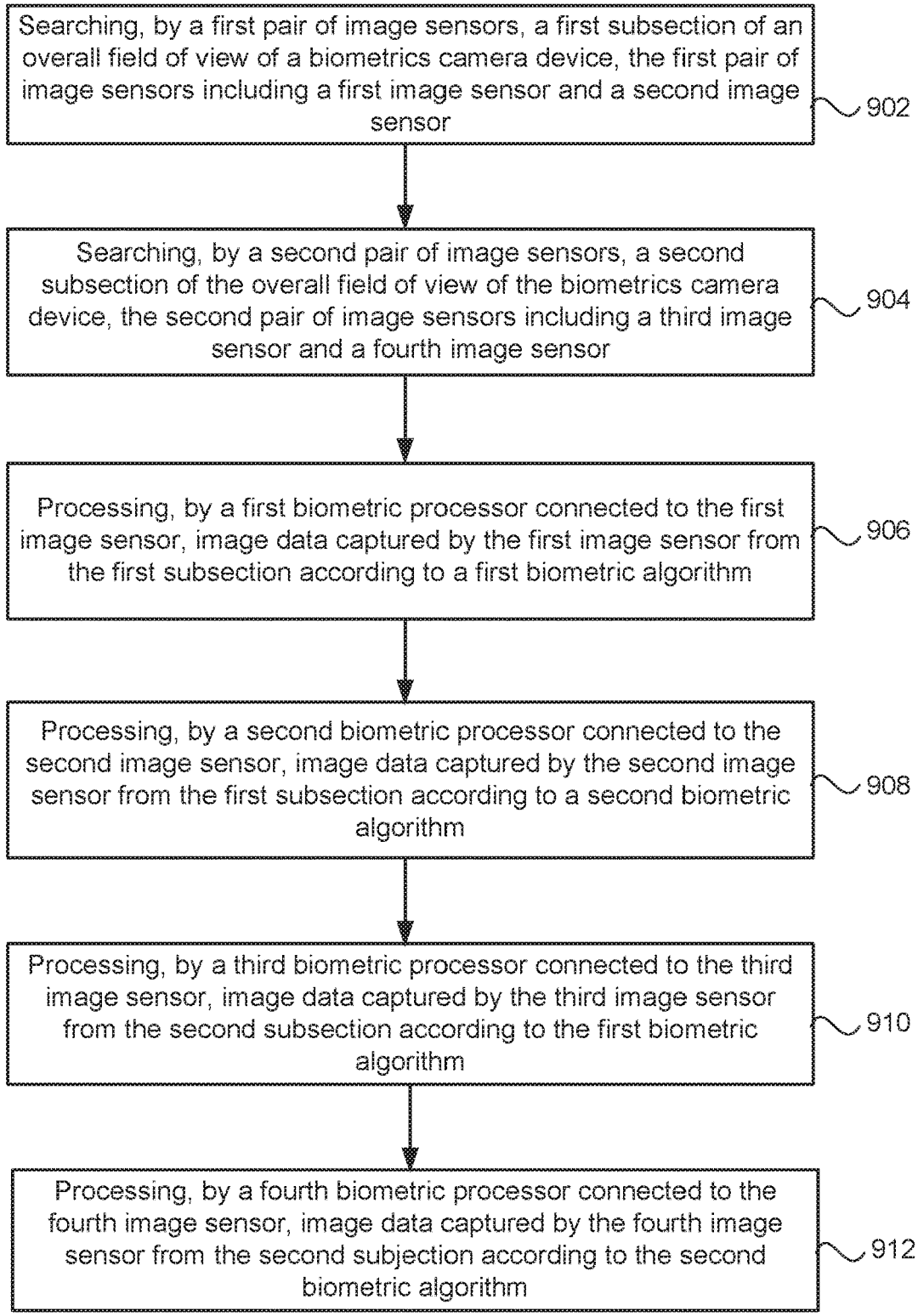
FIG. 9 is a flowchart illustrating example operations of a biometric camera device according to another implementation.

FIG. 9 is a flowchart 900 illustrating example operations of a biometric camera device according to another implementation. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion. The following operation may be performed by biometric camera device 100, 200, 500, and/or 600, and may include any additional features/operations discussed with reference to FIGS. 1, 2, 5 and 6.

Operation 902 includes searching, by a first pair of image sensors, a first subsection of an overall field of view of a biometrics camera device. The first pair of image sensors includes a first image sensor and a second image sensor.

Operation 904 includes searching, by a second pair of image sensors, a second subsection of the overall field of view of the biometrics camera device. The second pair of image sensors includes a third image sensor and a fourth image sensor.

Operation 906 includes processing, by a first biometric processor connected to the first image sensor, image data captured by the first image sensor from the first subsection according to a first biometric algorithm.

Operation 908 includes processing, by a second biometric processor connected to the second image sensor, image data captured by the second image sensor from the first subsection according to a second biometric algorithm.

Operation 910 includes processing, by a third biometric processor connected to the third image sensor, image data captured by the third image sensor from the second subsection according to the first biometric algorithm.

Operation 912 includes processing, by a fourth biometric processor connected to the fourth image sensor, image data captured by the fourth image sensor from the second subsection according to the second biometric algorithm.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A biometric camera device for capturing multiple biometrics at least partially in parallel, the biometric camera device comprising:
   a plurality of image sensors including a first image sensor and a second image sensor;
   a plurality of biometric processors including a first biometric processor connected to the first image sensor and a second biometric processor connected to the second image sensor,
   the first biometric processor configured to receive and process image data from the first image sensor according to a first biometric algorithm to extract a first biometric template relating to a first biometric,
   the second biometric processor configured to receive and process image data from the second image sensor according to a second biometric algorithm to extract a second biometric template relating to a second biometric, the second biometric being different from the first biometric, wherein image processing and extraction of the first biometric template are performed at least partially in parallel with image processing and extraction of the second biometric template; and
   a controller connected to each of the plurality of biometric processors, the controller configured to receive biometric data from each of the biometric plurality of biometric processors,
   wherein the controller is configured to receive reprogramming information from a host computer and reprogram the first biometric processor based on the reprogramming information to update the first biometric algorithm or implement a new biometric algorithm at the first biometric processor.

2. The biometric camera device of claim 1, wherein the controller includes an embedded memory, the embedded memory including a plurality of programming files, the plurality of programming files including a first programming file for the first biometric algorithm and a second programming file for the second biometric algorithm.

3. The biometric camera device of claim 2, wherein the controller is configured to update the first programming file based on the reprogramming information.

4. The biometric camera device of claim 1, wherein each of the first biometric and the second biometric includes face recognition, iris recognition, fingerprint recognition, or palm recognition.

5. The biometric camera device of claim 1, wherein the controller is communicatively coupled to the host computing device, wherein the controller is configured to transmit the biometric data to the host computing device.

6. The biometric camera device of claim 5, wherein the controller is configured to filter the biometric data to remove a portion of the image data captured by the first and second image sensors such that the filtered biometric data that is sent to the host computing device includes the first and second biometric templates and one or more reference images associated with the first and second biometrics.

7. The biometric camera device of claim 1, wherein the controller is configured to reprogram the first biometric processor to execute a third biometric algorithm to capture a third biometric using a third image sensor and a fourth image sensor based on the reprogramming information, the third and fourth image sensors being different from the first and second image sensors.

8. The biometric camera device of claim 1, wherein the plurality of image sensors define a total field of view, the total field of view being divided into distinct, separate subsections including a first subsection and a second subsection, the first image sensor having a field of view corresponding to the first subsection, the second image sensor having a field of view corresponding to the second subsection.

9. The biometric camera device of claim 1, wherein the first image sensor has a first field of view, and the second image sensor has a second field of view, the second field of view at least partially overlapping with the second field of view.

10. The biometric camera device of claim 1, wherein the first biometric processor includes a field-programmable gate array, and the controller includes a microcontroller having an embedded memory.

11. The biometric camera device of claim 1, wherein the first biometric processor includes an application specific integrated circuit (ASIC) processor, and the controller includes a microcontroller having an embedded memory.

12. The biometric camera device of claim 1, wherein a number of the plurality of image sensors is equal to or greater than ten.

13. The biometric camera device of claim 1, wherein the controller is connected to the first biometric processor via at least one data communication line and at least one reprogramming line, the at least one data communication line configured to transmit the biometric data, the at least one reprogramming line configured to transmit the reprogramming information.

14. The biometric camera device of claim 1, wherein the plurality of image sensors, collectively, define an overall field of view configured to simultaneously capture image information from a hand and a face of a person.

15. The biometric camera device of claim 1, further comprising:
a housing coupled to the plurality of image sensors, the plurality of biometric processors, and the controller.

16. A method for image processing for capturing multiple biometrics at least partially in parallel, the method comprising:
detecting, by a first image sensor of a plurality of image sensors, first image data, the plurality of image sensors defining a total field of view, the first image sensor having a first field of view that corresponds to a first subsection of the total field of view;
detecting, by a second image sensor of the plurality of image sensors, second image data, the second image sensor having a second field of view that corresponds to a second subsection of the total field of view;
processing, by a first biometric processor connected to the first image sensor, the first image data according to a first biometric algorithm to extract a first biometric template relating to a first biometric;
processing, by a second biometric processor connected to the second image sensor, the second image data according to a second biometric algorithm to extract a second biometric template relating to a second biometric, the second biometric being different from the first biometric, wherein image processing and extraction of the first biometric template are performed at least partially in parallel with image processing and extraction of the second biometric template;
receiving, by a controller connected to each of the first and second biometrics processors, the first biometric template and the second biometric template from the first biometric processor and the second biometric processor, respectively;
receiving, by the controller, reprogramming information from a host computer communicatively coupled to the controller; and
reprogramming, by the controller, the first biometric processor based on the reprogramming information to update the first biometric algorithm or implement a new biometric algorithm at the first biometric processor.

17. The method of claim 16, wherein the controller includes an embedded memory, the embedded memory including a plurality of programming files, the plurality of programming files including a first programming file for the biometric algorithm and a second programming file for the second biometric algorithm, wherein the reprogramming step includes writing a new programming file for a third biometric algorithm to be executed by the first biometric processor, the third biometric algorithm being different from the first biometric algorithm and the second biometric algorithm.

18. The method of claim 16, further comprising:
detecting, by a third image sensor of the plurality of image sensors, third image data, the third image sensor having a third field of view that corresponds to a third subsection of the total field of view; and
processing, by a third biometric processor connected to the third image sensor, the third image data according to a third biometric algorithm to extract a third biometric template relating to a third biometric, the third biometric being different from the first biometric and the second biometric, wherein image processing and extraction of the third biometric template are performed at least partially in parallel with image processing and extraction of the second biometric template.

19. A non-transitory computer readable medium storing executable instructions that when executed by at least one processor is configured to perform image processing for capturing multiple biometrics at least partially in parallel, the executable instructions configured to cause the at least one processor to:
detect, by a first image sensor of a plurality of image sensors, first image data, the plurality of image sensors defining a total field of view, the first image sensor having a first field of view;

detect, by a second image sensor of the plurality of image sensors, second image data, the second image sensor having a second field of view, the second field of view at least partially overlapping with the first field of view;

process, by a first biometric processor connected to the first image sensor, the first image data according to a first biometric algorithm to extract a first biometric template relating to a first biometric;

process, by a second biometric processor connected to the second image sensor, the second image data according to a second biometric algorithm to extract a second biometric template relating to a second biometric, the second biometric being different from the first biometric, wherein image processing and extraction of the first biometric template are performed at least partially in parallel with image processing and extraction of the second biometric template;

receive, by a controller connected to each of the first and second biometrics processors, the first biometric template and the second biometric template from the first biometric processor and the second biometric processor, respectively;

receive, by the controller, reprogramming information from a host computer communicatively coupled to the controller; and reprogram, by the controller, the first biometric processor based on the reprogramming information to update the first biometric algorithm or implement a new biometric algorithm at the first biometric processor.

20. The non-transitory computer readable medium of claim 19, wherein the executable instructions include instructions that when executed by the at least one processor cause the at least one processor to:

detect, by a third image sensor of the plurality of image sensors, third image data, the third image sensor having a third field of view, the third field of view being a subsection of a total field of view different than the first field of view; and process, by a third biometric processor connected to the third image sensor, the third image data according to a third biometric algorithm to extract a third biometric template relating to a third biometric, the third biometric being different from the first biometric and the second biometric, wherein image processing and extraction of the third biometric template are performed at least partially in parallel with image processing and extraction of the second biometric template.

\* \* \* \* \*